Patented May 17, 1949

2,470,363

UNITED STATES PATENT OFFICE 2,470,363

MELAMINE-FORMALDEHYDE CASTING RESIN

Harold W. Mohrman, Springfield, Mass., assignor to Monsanto Chemical Company, St. Louis, Mo., a corporation of Delaware No Drawing. Application January 13, 1945, Serial No. 572,751

7 Claims. (Cl. 260—67.6)

This invention relates to cast melamine formaldehyde resin.

Numerous attempts have been made to prepare cast melamine formaldehyde resins. However, difficulty has been encountered in producing transparent castings which are stable over long periods of time. Prior products have been found to develop cracks, crazing and the like on standing, particularly when subjected to atmospheric conditions of varying humidity.

It is an object of this invention to provide improved melamine-formaldehyde casting resins.

It is a particular object of this invention to provide cast melamine formaldehyde resins which are stable on standing for substantial periods of time.

These and other objects are attained by employing the reaction conditions and sequence of steps set forth hereinafter. Thus, according to this invention, a mixture of from 2.5 to 4.5 mols of formaldehyde are reacted with one mol of melamine under substantially neutral conditions to form a partially condensed polymethylol melamine. The pH of the mixture is then raised to about 7.7-8.3 and the product dehydrated and further reacted by vacuum distillation at an elevated temperature, the heating being continued under a high vacuum until the product has the viscosity of about 2000 to 6000 centipoises at 80° C. The casting resin so obtained is then poured into a suitable mold and hardened by heating. It is found that the cured castings prepared in this manner are not only transparent but possess an unusual resistance to cracks and other defects on aging.

The following is a specific example illustrative of the process of the present invention but is not to be construed as limitative thereof. Parts are by weight.

Example

One mol of melamine is mixed with three mols of formaldehyde in the form of commercial aqueous formaldehyde solution (37% formaldehyde by weight) having a pH of about 3.2 at room temperature, i. e., about 25° C. The pH of the mixture is about 6.0 and is raised to between 7.0 and 7.3 by the addition of a sufficient amount of triethanolamine. The resulting mixture is stirred and heated in a vessel equipped with a water cooled return condenser at a temperature of 70 to 78° C. until the melamine passes into solution and thereafter the heating is continued under the same conditions until the solution possesses a viscosity of 100 centipoises at 25° C. The pH of the product is raised to 7.7-8.0 by the further addition of a sufficient amount of triethanolamine and thereafter the product is heated under a gradually increasing vacuum to remove the water and further advance its resinification. During the dehydration, the temperature of the reaction mixture drops initially to about 40-50° C. and then is gradually raised to about 80° C. The heating is continued at this temperature and under a reduced pressure which during the final stages drops to absolute pressure corresponding to about ½ inch of mercury. The heating under these conditions is continued until the product has a viscosity of about 4000 centipoises at 80° C. The product is then poured into lead molds and hardened by heating at 80° C. for four days. The cooled castings after ejection from the lead molds are found to be clear, hard and colorless. They retain these advantageous characteristics over long periods of time, i. e. on aging for several years even under conditions of varying humidity.

The unusual durability of the cast resins of the invention as illustrated by the product described in the example is particularly unexpected in view of the absence of glycerin or other material of a plasticizing nature usually considered necessary in formulating casting resins of this general type. However, when it is desired to modify the working characteristics of the products of this invention various materials of a plasticizing nature may be used. Generally high boiling water-soluble materials are preferred such as glycerine, glycols such as ethylene glycol, diethylene glycol, triethylene glycol and the like. For example up to about 50 parts of glycerine per mol of melamine in the original reaction mixture may be incorporated prior to casting. A convenient point at which to add such materials is at the start of the vacuum distillation.

Various modifications may be introduced into the process of the invention as illustrated by the example. Thus, the reaction temperature may be substantially varied although generally temperatures between 60° C. and 90° C. are preferable, an 80-90° C. temperature being especially preferred during the dehydration.

Mixtures of melamine and commercial formaldehyde solutions tend to have a pH below the desired range, particularly when a high molar proportion of formaldehyde to melamine is used, e. g. 2.5:1 or higher. In such cases, as illustrated by the example, water-soluble organic bases are used to raise the pH to the desired value. Examples of water-soluble organic bases which may be used are the ethanolamines, e. g. monoethanolamine, diethanolamine, triethanol amine, ethylene diamine, aniline, quaternary ammonium bases, such as, dimethyl dibenzyl ammonium hydroxide, trimethyl benzyl ammonium hydroxide, tetraethyl ammonium hydroxide, tetraethanol ammonium hydroxide and the like. Inorganic bases such as the hydroxides and carbonates of sodium and potassium are to be avoided at this stage since their use has a deleterious effect, for example, the reaction cannot be properly controlled and useless or inferior products are obtained. However, such alkaline materials may be used in raising the pH of the reaction mixture just prior to dehydration.

The pH during the initial reaction is maintained in the range of 6.7–7.3 and preferably within the range 7.0–7.3 since the use of either a higher or lower pH results in inferior products. Thus, the use of a lower pH produces an uncontrollable reaction and a higher pH detracts from the clarity of the final product. The pH of the reaction mixture is adjusted to 7.7–8.3 and preferably 7.7–8.0 prior to dehydration in providing products having the unexpectedly desirable characteristics of the products of this invention.

If it should be necessary to use acidic materials in adjusting the pH of the reaction mixture to the desired value at any stage, e. g. in the event that neutral formaldehyde solution is used, weak water-soluble organic acids are preferred such as formic acid, acetic acid, lactic acid, glycollic acid and the like; although mineral acids such as hydrochloric, sulphuric, phosphoric and the like may be used.

The concentration of the aqueous formaldehyde solution may be varied substantially. Commercial formalin contains about 37% formaldehyde by weight, the remainder being substantially water and a few percent methanol. However, other concentrations of formaldehyde may be used, e. g. 30%. Furthermore, methanol-free aqueous solutions of formaldehyde may be used.

The degree of condensation or polymerization of the polymethylol melamine prior to dehydration may be substantially varied. Particularly good results are obtained by continuing the heating in this stage until the reaction mixture has a viscosity of 60–200 centipoises at 25° C., when the formaldehyde solution used is about 37% in strength. Corresponding degrees of condensation or polymerization are desirable when formaldehyde solutions having other concentrations of formaldehyde are used.

The pH values given hereinbefore are obtained by means of a Leeds-Northrup potentiometer (glass electrode type).

It is to be understood that the above description is given by way of illustration only, and not of limitation, and that deviations are possible within the spirit of the invention.

What is claimed is:

1. A process for producing a melamine-formaldehyde casting resin which comprises heating a mixture of 1 molecular proportion of melamine and an aqueous solution of 2.5–4.5 molecular proportions of formaldehyde at a pH of 6.7 to 7.3 to form a polymethylol melamine, partially condensing the polymethylol melamine by continued heating until the product has a viscosity of 60–200 centipoises at 25° C. and at the concentration resulting from the use of aqueous formaldehyde solution having a formaldehyde concentration of 37%, raising the pH of the reaction mixture to 7.7 to 8.3 and dehydrating the reaction mixture by vacuum distillation.

2. A process for producing a melamine-formaldehyde cast resin which comprises heating a mixture of one molecular proportion of melamine and an aqueous solution of 2.5 to 4.5 molecular proportions of formaldehyde at a pH of 6.7 to 7.3 to form a polymethylol melamine, partially condensing the polymethylol melamine by continued heating until the product has a viscosity of 60–200 centipoises at 25° C. and at the concentration resulting from the use of aqueous formaldehyde solution having a formaldehyde concentration of 37%, raising the pH of the reaction mixture to 7.7 to 8.3, dehydrating the reaction mixture by vacuum distillation, casting the dehydrated product into a mold and curing by the application of heat.

3. A process as defined in claim 2 in which the mixture of melamine and formaldehyde is initially reacted at a pH of 7.0 to 7.3.

4. A process for producing a melamine-formaldehyde casting resin which comprises heating a mixture of one molecular proportion of melamine and an aqueous solution of about 3 molecular proportions of formaldehyde containing about 37% HCHO by weight at a pH of 7.0 to 7.3 and a temperature of 60–90° C. until the reaction mixture has a viscosity of 60–200 centipoises at 25° C., raising the pH of the reaction mixture to 7.7 to 8.3 and dehydrating the reaction mixture by vacuum distillation at an elevated temperature.

5. A process as defined by claim 2 in which the pH of the initial mixture of formaldehyde and melamine is adjusted to about 6.7 to 7.3 by the addition of a water soluble organic base.

6. A process as defined by claim 2 in which the pH of the initial mixture of formaldehyde and melamine is adjusted to about 6.7 to 7.3 by the addition of an ethanol amine.

7. A process as defined by claim 2 in which the pH of the initial mixture of formaldehyde and melamine is adjusted to 6.7 to 7.3 by the addition of a quaternary ammonium base.

HAROLD W. MOHRMAN.

REFERENCES CITED

The following references are of record in the file of this patent:

UNITED STATES PATENTS

| Number | Name | Date |
| --- | --- | --- |
| 2,260,239 | Talbot | Oct. 12, 1941 |
| 2,327,771 | D'Alelio | Oct. 19, 1943 |
| 2,385,383 | Schroy | Sept. 25, 1945 |
| 2,385,384 | Schroy | Sept. 25, 1945 |

FOREIGN PATENTS

| Number | Country | Date |
| --- | --- | --- |
| 116,622 | Australia | Feb. 23, 1942 |
| 557,558 | Great Britain | Nov. 25, 1943 |